Patented Apr. 19, 1938

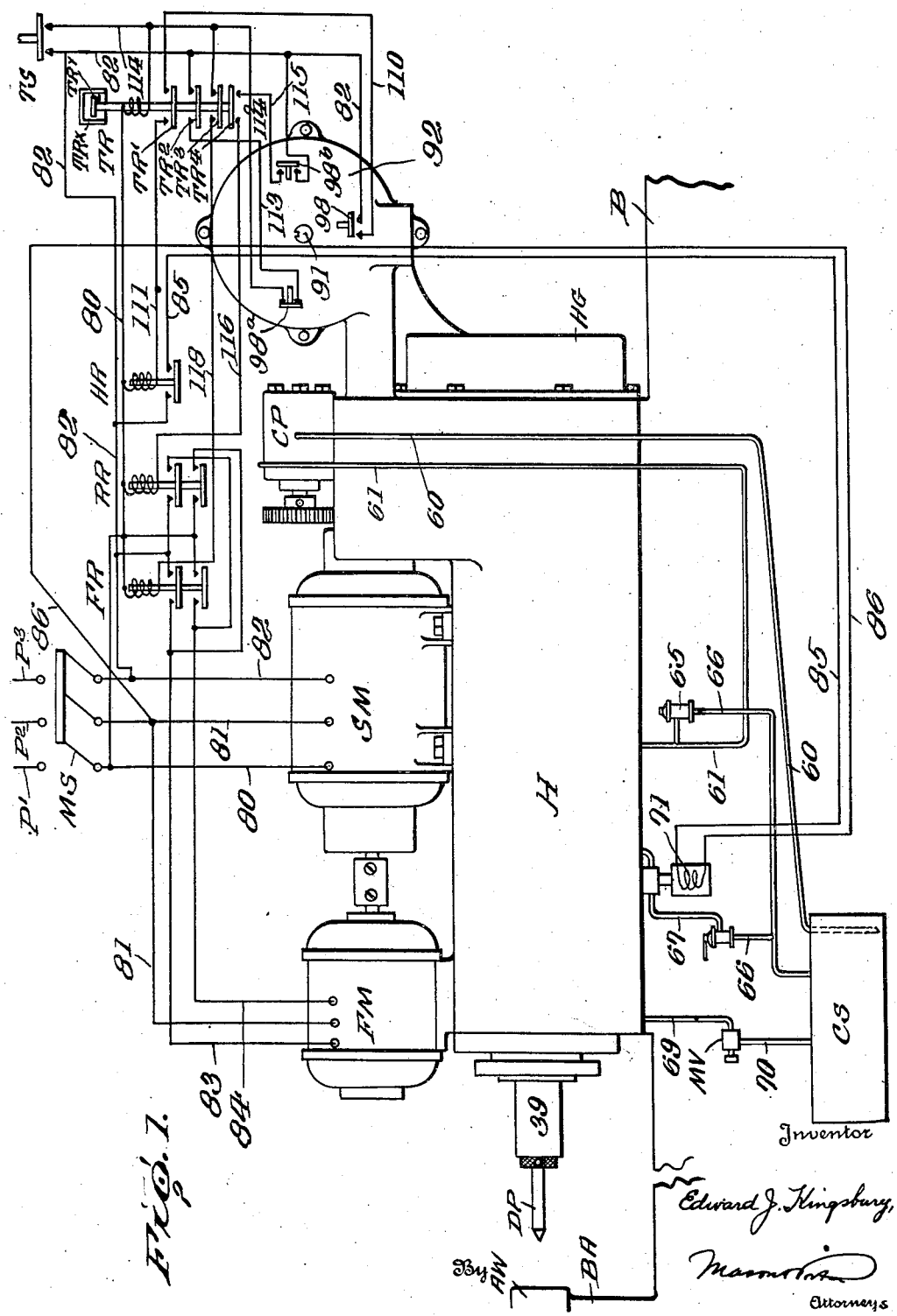

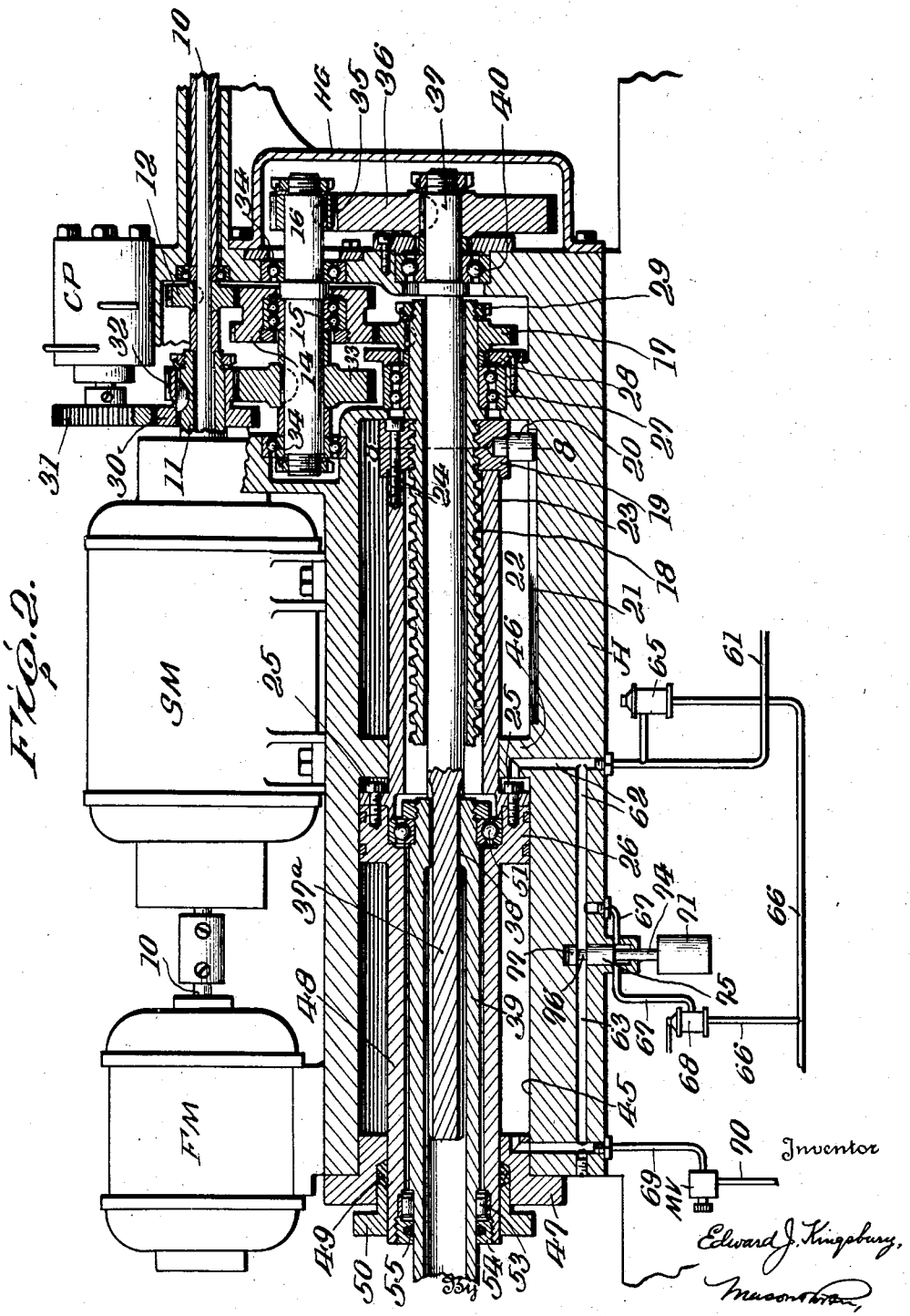

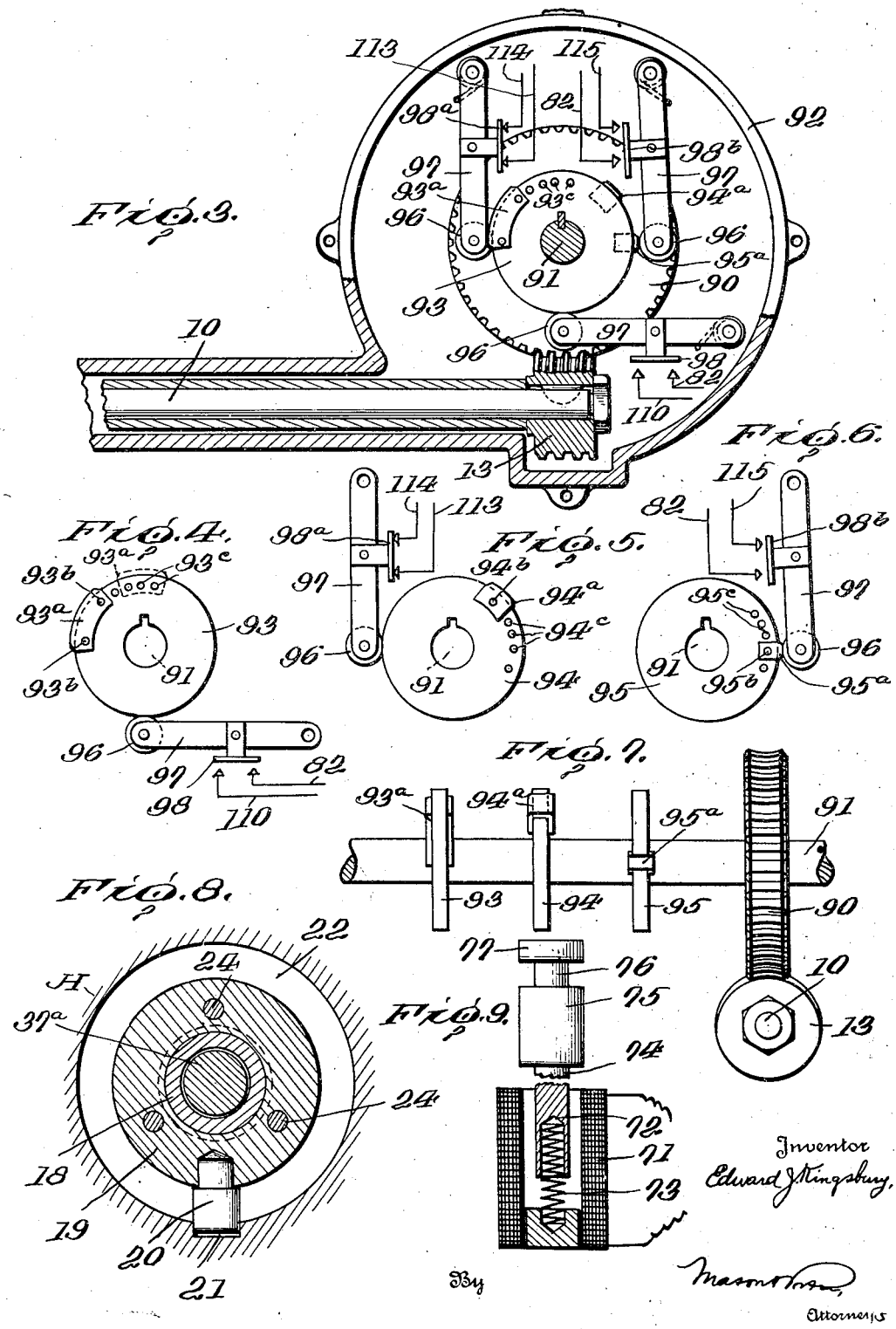

2,114,389

UNITED STATES PATENT OFFICE 2,114,389

MACHINE TOOL STRUCTURE WITH FEEDING APPARATUS

Edward Joslin Kingsbury, Keene, N. H.

Application February 25, 1936, Serial No. 65,723

13 Claims. (Cl. 77—32)

This invention relates to a machine tool structure having a feeding apparatus for reciprocating the tool; and is more particularly concerned with apparatus for performing drilling or like operations by combined reciprocating and rotating motions of the tool holder relative to the work.

One object of the present invention is to provide a machine tool having fluid-operated feeding mechanisms and means for supervising the operation of the same in proper sequence and at proper times during the course of the reciprocating movement of the tool holder relative to the work.

A further feature of the present invention is the provision of a fluid-pressure feeding system with control elements which are actuated in proper sequence and at proper times by a supervisory electrical system.

A further feature of the present invention is the provision of a machine tool structure employing motor means for rotating the spindle and for operating a constant volume pump, a feed motor means for obtaining a mechanical feeding of the spindle under control and in cooperation with a hydraulic feeding system, and means controlled by the relative movement of parts for effecting the necessary changes of speed and direction in the course of a cycle of movement.

A further feature of the present invention is the provision of a machine tool having feeding apparatus embodying both mechanical and fluid pressure devices cooperative for obtaining the traverse and feeding movements of the parts under supervision of a control system which determines the operation of the parts of both the mechanical and hydraulic feeding structures.

Still another feature of the present invention is the provision of a machine tool having cooperative hydraulic and mechanical feeding mechanisms supervised by a controlled electrical system which determines the operation of both the hydraulic and mechanical structures.

With these and other features as objects in view, an illustrative form of practicing the invention has been shown on the accompanying drawings, in which:

Figure 1 is a conventionalized diagrammatic view showing hydraulic and electrical connections in the system.

Figure 2 is a view of a machine tool unit embodying the present invention, on a larger scale than that employed in Fig. 1, and showing parts of the mechanical and hydraulic feeding structures in section.

Figure 3 is a detail view, on a larger scale than that of Fig. 2, showing the electrical contactor structures for supervising the feeding or traverse movements.

Figures 4, 5 and 6 are diagrammatic detail views showing portions of the contact structures.

Figure 7 is a detail showing arrangements of the structures of Figs. 4, 5 and 6, and the means for driving the same.

Figure 8 is a fragmentary transverse sectional view substantially on line 8—8 of Fig. 2.

Figure 9 is a detail view, on a larger scale, conventionally showing a solenoid arrangement for actuating a control valve.

In these drawings, the machine tool is illustrated as of the composite type shown in Patent No. 1,975,005, granted to Edward J. Kingsbury and Gunnar Swahnberg September 25, 1934; and in Patent No. 2,011,487 granted to Edward J. Kingsbury August 13, 1935, and Patent No. 1,975,007 granted to Edward J. Kingsbury September 25, 1934; and comprises a base B having a support BA thereon upon which is clamped the article of work AW upon which a drilling operation is to be performed by the drill point DP. In the structure shown in these patents, this base is provided with one or more machine tool units, one of which has been set out in the accompanying drawings as having a main housing H upon which is mounted a feed motor FM and a spindle motor SM. The shaft 10 of the feed motor FM is extended through the hollow shaft 11 of the spindle motor and has keyed thereon a gear 12 and a worm 13 (Fig. 3). In accomplishing the mechanical feeding, it will be understood that the feed motor FM is rotated in one or another direction, accordingly as the drill point DP is to be moved toward or from the work. The gear 12 is in mesh with a double gear body 14 which is mounted loosely by anti-friction bearings 15 for movement about the spindle countershaft 16. The double gear body 14 has its other gear portion in mesh with a gear 17 keyed at the rear end of an externally threaded sleeve 18 which is received in the nut 19. The nut 19 has a radially projecting pin 20 engaged (Figs. 2 and 8) in a slot 21 formed in the wall of the chamber 22 of the housing H, this chamber receiving the sleeve 18, the nut 19 and a supporting bushing or piston rod 23 connected to the nut 19 by screws 24 at its rear end and having at its front end a flange secured by cap screws 25 to a piston head portion 26. When the feed motor FM revolves, drive is accomplished through the aforesaid train, and the threaded sleeve 18 is revolved and thus the nut 19 is caused to travel back and forth, depending upon the direction of rotation of the feed motor FM. The sleeve 18 is supported by anti-friction bearings 27 which are secured in the housing H by being pressed against the abutment flange by the action of a clamping plate 28. The gear 17 is held on the sleeve by a clamping nut 29.

The spindle motor SM has a gear 30 on its shaft in engagement with the gear 31 of a constant volume pump CP which may be of the gear type, for example, and is supported upon the housing H.

The shaft 11 of the spindle motor SM also has a gear 32 keyed thereto and in mesh with the gear 33 keyed to the spindle countershaft 16, which is supported by the anti-friction bearings 34 in the housing H. The countershaft 16 extends beyond the rear wall of the housing H and has a pick-off gear 35 keyed thereto and in mesh with a second pick-off gear 36 which is keyed to the spindle shaft 37. A guard plate HG is fastened to the housing H for protecting these gears 35 and 36. The spindle shaft 37 extends through the hollow sleeve 18 and is splined at its forward end 37a and engaged in the internal splines 38 of the spindle 39. The spindle shaft is supported in the housing H by an anti-friction bearing 40 adjacent the gear 36.

In addition to the chamber 22 in the housing H, the latter is also provided with a chamber 45 providing a hydraulic cylinder for receiving the piston head portion 26, and shut off from the chamber 22 by the annular wall 46 which closely embraces the external surface of the bushing 23, and this cylinder 45 is closed off at its front end by a head 47.

The piston head portion 26 is illustrated as formed integrally with a piston rod 48 which passes through an aperture in the cylinder head 47, and is sealed therein by a packing 49 secured by a gland nut 50. Internally, the piston portion 26 and the piston rod 48 are provided with an anti-friction bearing 51 for rotatably supporting the spindle 39 adjacent its rear end and operating for resisting axial movement relative to the assembly of the piston rod 48 and the bushing 23. This anti-friction bearing 51 is held in clamped position by a flange of the bushing 23 which engages its hub race, and thus the cap screws 25 maintain the parts in position. At the front end of the piston rod 48 (at the left in Fig. 2), it is provided with a second anti-friction bearing 53 which supports the major portion of the radial load on the spindle as it is located close to the work, and for this purpose has been illustrated as a roller bearing which is held in position by an internal clamping member 54 having a further packing 55 for preventing the passage of oil away from the anti-friction bearings 53 and 51, and access of chips and dirt thereto.

As shown in Figs. 1 and 2, the system is of hydraulic type and includes a collection sump CS having a supply pipe 60 leading therefrom to the pump CP, at which the oil or other liquid medium is placed under pressure and sent through the delivery pipe 61 to a passage 62 formed in the housing H, and open at the right-hand end of the cylinder 45 (Fig. 2) and having a branch in alignment and normal communication with a passage 63 which communicates with the cylinder 45 at its other end. A branch from the pipe 61 leads to a pressure relief valve 65 which may be of any desired construction and permits the escape of the liquid, when the pressure is too great, by a conduit 66 back to the sump CS.

Thus, by adjusting the valve 65, the maximum pressure may be determined; and hence the sensitivity with which the drill point DP is presented to the work, or other actions accomplished as will be set out hereinafter.

The passage 62 has a further branch for communication by a conduit 67 to a second adjustable relief valve 68 and thence by conduit 66 back to the sump. A branch from passage 63 communicates with a conduit 69 and thus with the metering valve MV, which may be of the needle valve type, for permitting the flow of the metered quantity of liquid through the conduit 70 back to the sump CS.

The passages 62 and 63 are normally in communication with one another, but may be shut off by a solenoid-actuated valve as shown in Figs. 2 and 9. This solenoid is illustrated as of the type disclosed in United States Letters Patent No. 1,987,555 to B. N. Foster. The solenoid coil 71 attracts its core 72 against the action of the return spring 73, and thus moves the core downwardly when the coil 71 is energized. This core is illustrated as integral with a valve structure having a reduced portion 74, an enlarged head portion 75, a second reduced portion 76, and an upper head portion 77. In the normal position of the parts (full line, Fig. 2) the reduced portion 76 lies in extension of the conduits 62 and 63 and permits communication therebetween. At this time also the reduced portion 74 is located opposite the ports of conduit 67 so that this conduit is open and fluid can move from the communicating conduits 62, 63 to the relief valve 68. Upon energization of the solenoid 71, its core 72 is drawn downward so that the upper head 77 shuts off communication between the passages 62, 63, and the head 75 shuts off communication through the conduit 67.

As shown in Fig. 1, the motor means FM and SM are driven by current taken from a three phase system having phase conductors P1, P2, P3 controlled by the main switch MS. Current flows by the three phase conductors 80, 81, 82 to the spindle motor SM as soon as the switch MS is closed; and thus the spindle is caused to rotate and the pump CP is driven to deliver a constant volume of fluid through the conduit 61.

Branches of conductors 80 and 82 lead to contacts of the "forward" relay FR and the "reverse" relay RR; and further conductors 83, 84 extend from the other contacts of these relays with proper reversal of connection at the two relays for supplying current to feed motor FM in conjunction with conductor 81, the relative direction of movement of the rotating field in the motor FM being controlled by the selectively reversed connection of the conductors 83, 84, by the selective actuation of relays FR and RR in the usual way. A further branch of conductor 82 leads to the contact of the hydraulic relay HR whose other contact is connected by a conductor 85 with the solenoid winding 71, and thence by a return conductor 86 back to conductor 81. The relays FR, RR and HR normally have their contacts open.

The worm 13 on the feed motor shaft 10 is in mesh with a wormwheel 90 on the shaft 91 supported in a housing 92 carried by the housing H. This shaft 91 has three disks 93, 94, 95 keyed thereto. The disk 93 is provided with a separable cam piece 93a which is secured thereto in proper angular position with respect to the keyway by screws 93b which engage in appropriate pairs of the peripheral row of holes 93c; in this way the cam piece 93a may be properly positioned for determining the time of ending of the rapid approach traverse and the time of beginning of the fine working feed; and this fine working feed would normally continue for the entire peripheral length of the cam piece 93a. By employing a plurality of short cam pieces 93a (dotted lines), therefore, "jump feeding" may be accomplished so that there is a fine working feed while the drill is passing through a thin wall, a rapid traverse until the drill approaches another wall, and a fine working feed for the advancement of the drill through this second wall. This disk 93 cooperates with the roller 96 and a lever 97 pivoted in the casing 92 and having a contact bridge 98 for closing contacts for establishing a circuit from conductor 82 to conductor 110, which is normally held open by the bridge TR1 of the timing relay TR, and thence by conductor 111 to the coil of the hydraulic relay HR, with a return to conductor 80. The hydraulic relay HR is therefore energized, and thus the solenoid winding 71 is energized as soon as the disk 93 causes the contact bridge 98 to close.

The disk 94 has a similar cam piece 94a secured by a screw 94b inserted in any of the peripheral row of holes 94c. This cam piece similarly cooperates with a lever structure having a roller 96, a lever 97 and a bridge 98a; but it will be noted that the bridge 98a normally holds its circuit closed, and that the circuit is opened by the engagement of the cam piece 94a with the corresponding roller 96. This circuit extends from conductor 82 through the normally opened bridge TR2 of relay TR, and thence by conductor 113 to the bridge 98a, with a return by conductor 114 to the coil of the timing relay TR, and a final return to the conductor 80.

Similarly, the disk 95 is provided with a cam piece 95a which is held by a screw 95b passing through one of the peripheral row of holes 95c. This cam piece 95a cooperates with a roller 96 supported by the lever 97, this lever having a normally closed contact bridge 98b. The circuit leading to the contacts for the bridge 98b extends from conductor 82 to one of these contacts, and thence from the other contact by conductor 115 to the normally closed bridge TR4 of the timing relay TR, and by conductor 116 to the coil of the reverse relay RR, with a final return to conductor 80.

The gearing ratio between the worm 13 and the worm wheel 90 is such that the shaft 91 does not make a complete revolution for a complete stroke of the drill spindle in either direction; and it will be noted that the shaft 91 follows in unison with the movements of the drill spindle itself.

The timing relay TR is provided with a timing device TRx, illustrated as a dash-pot, and operating to control the movement of this relay in opening and closing its contacts. This delay device TRx is illustrated as having an adjustment means TRy for determining the rapidity with which the timing relay responds. This relay closes instantly when the coil is energized, thus breaking contacts at the bridge TR4 and closing the contacts at the bridges TR1, TR2, TR3, but delays its action upon de-energization so that current is maintained at bridges TR1, TR2, TR3 for a period of time determined by the device TRy (as for example, one second) before these bridges are re-opened; and, similarly, the contact bridge TR4 is not closed, and by construction in the usual manner, the contact TR4 is not closed until after the other contacts TR1, TR2, TR3 are opened.

The cycles of operation of the structure are initiated by the tripping switch TS which may be moved by hand, or automatically, in the manner taught for the starting devices of the aforesaid patents.

The operation of the structure is as follows:
When the switch MS is closed, the spindle 39 and the drill point DP are revolved, and therewith the constant volume pump CP operates to deliver fluid through the delivery pipe 61. The solenoid winding 71 is de-energized, and the passages 62 and 63 are in communication so that fluid may flow from one end of the cylinder 45 to the other. The pressure prevailing in these passages is, however, limited by the flow of fluid through conduit 67, past the reduced portion 74 of the solenoid valve, and through the relief valve 68 which is set at a low pressure of, say, 20 pounds, so that the maximum energy available in the hydraulic system is limited to this pressure. The spindle is normally in withdrawn position, as shown by full lines in Fig. 2, so that the piston head portion 26 is at the right-hand end of its cylinder, and the nut 19 is at the right-hand end of its threaded sleeve 18. The cam piece 95a is holding the bridge 98b open. The relays FR, RR, HR and TR are de-energized, and only the circuit from conductor 115 to 116 is closed at any of these relays. Tripping switch TS is open. The feed motor FM is de-energized and at a standstill, and the threaded sleeve 18 is at a standstill.

To start a cycle, the tripping switch TS is closed so that current flows from conductor 82, through the bridge of tripping switch TS, to conductor 114, through the coil of the timing relay TR, and thus back to conductor 80. The timing relay TR is energized and closes its bridges TR1, TR2, TR3 and opens the bridge TR4.

The closure of bridge TR2 establishes a closed shunt around tripping switch TS, so that the latter may now be opened while the timing relay TR is kept energized, this circuit extending from conductor 82, by contact bridge TR2, conductor 113, normally closed bridge 98a, conductor 114, the coil of timing relay TR, back to conductor 80. At the same time, the closure of timing relay TR sets up a circuit from conductor 114, bridge TR3, conductor 118, the coil of the "forward" relay FR, to conductor 80. The "forward" relay FR is energized and closes its bridges, so that current flows and energizes the feed motor FM for rotation in a forward direction. The shaft 10 rotates gear 12, and through the double gear 14 turns the gear 17 and therewith the threaded sleeve 18, so that the nut 19 is caused to move toward the left in Fig. 2, advancing the spindle 39. At this time, also, liquid is flowing from the constant pressure pump CP by conduit 61 toward the right-hand end of the cylinder 45 by passage 62, and also is flowing toward the left-hand end of the cylinder 45 by passages 62, 63, and past the open solenoid control valve. Since the cylinder 45 is normally maintained full of liquid, there is in effect a transfer of liquid from one end of the cylinder to the other through the by-pass 62, 63, with a limited flow of liquid through the feed controlling valve MV back to the sump, and with a release of the excess of liquid being delivered from the pump CP through the low pressure relief valve 68.

This action continues as a rapid approach traverse until the cam piece 93a encounters the corresponding roller 96 and closes the bridge 98. A circuit is now set up from conductor 82 by bridge 98, conductor 110, bridge TR1, conductor 111, the coil of the hydraulic relay HR, back to conductor 80. Hydraulic relay HR closes and sets up a further circuit from conductor 82 via the relay bridge, conductor 85, the winding of solenoid 71, conductor 86, back to conductor 81. The solenoid is energized and closes its valve structure, so that communication is shut off from passage 62 to passage 63, and also the communication from passage 62 to passage 67 and the low pressure relief valve 68. Liquid can no longer flow through the by-pass 62, 63, and the pressure of liquid supplied by the pump CP builds up until released at the high pressure relief valve 66 at, say, 100 pounds pressure. The power for the working feed is thus being supplied from the pump CP, while the feed motor FM may be very small, and operates in effect as a pilot for controlling the time at which the valves and circuits are changed over, but is not required to deliver the energy of feeding the drill or like tool into the work.

The closure of the solenoid-actuated valve in passage 62, 63 also has compelled the liquid in the left-hand end of cylinder 45 to find its escape through the feed controlling valve MV which may be regulated for controlling the flow, and thus for accurately determining the rate of the feed. The feed motor FM is preferably of the "torque" type, in this illustrative form, so that it may be operated at a very low rate of speed, due to the back pressure being developed along the gear train.

Ultimately, when the hole, for example, has been drilled to the desired depth, the cam piece 94a encounters the corresponding roller 96 and opens the bridge 98a. This interrupts the maintaining circuit through the coil of the timing relay TR, so that this relay is de-energized; and since the circuit through conductor 114 is without energy, its branch by conductor 118 is de-energized, so that the "forward" relay FR immediately drops and de-energizes the feed motor FM. The resistance to advancement of the spindle by the action of the drill or other tool upon the work rapidly brings the feed motor FM to a standstill, so that the electrical system thus operates to produce a dwell upon the work. It will be noted that the nut 19, in conjunction with the threaded sleeve 18, provides a stop, so that the hydraulic system itself is not able to accomplish a forward feeding although it holds the parts definitely advanced for the "seating" effect of a dwell operation.

Depending upon the time for which the adjustment TRy has been set (from zero to one second, say), the timing relay TR now drops open, thus interrupting the circuit through the coil of hydraulic relay HR, on the one hand, and operating at its bridge TR4 to close a circuit from conductor 82, through the closed bridge 98b, conductor 115, bridge TR4, conductor 116, the coil of "reverse" relay RR, back to conductor 80. The first action de-energizes the solenoid 71, so that the solenoid-actuated valve drops open and re-establishes the by-pass by passages 62—63; and also permits escape of liquid at excess pressure through the passage 67, and the low pressure relief valve 68. Since the two ends of the cylinder are connected together, there is no longer a hydraulic effort operating to accomplish a forward feed. The second of these effects at the timing relay TR results in the energization of the "reverse" relay RR, and therewith the energization of the feed motor FM for operation in the reverse direction.

The reversal of the feed motor FM causes the gear train to turn the threaded sleeve 18, and therewith withdraw the nut 19 and the spindle back toward withdrawn position.

During the reversed rotation of the parts on shaft 91, the action of cam piece 93a in closing the bridge 98 is without effect, as the corresponding circuit is interrupted at the open bridge TR1.

At the end of the withdrawal movement, the cam piece 95a encounters the corresponding roller 96 and opens the bridge 98b, thus breaking the circuit through the coil of "reverse" relay RR, and this relay now drops open and the feed motor FM comes to a standstill.

A cycle of operation has thus been completed, and the parts are in position for the commencement of a further cycle upon closure of the tripping switch TS.

It is obvious that the form shown on the drawings is merely illustrative of the practicing of the invention, and that the same may be employed in many ways without departing from the scope of the appended claims.

I claim:

1. In a machine tool, fixed and movable structures, cylinder and piston members connected to said structures, nut and screw means connected to said fixed structure and to one of said members, a pump, a conduit connecting said pump to one end of the cylinder member for producing a forward movement of the movable structure, a discharge conduit having a metering valve for limiting the escape of fluid from the other end of the cylinder member, a by-pass between the ends of the cylinder member and a valve for closing the by-pass, motor means for causing said nut and screw means to produce an initial rapid forward traverse of the movable structure at a rate substantially independent of the delivery by said pump, said by-pass being effective to permit said rapid forward traverse substantially without retardation, and means responsive to the distance of forward traverse for closing said by-pass valve so that the metering valve is rendered effective to determine a continued slow working traverse of the movable structure, said responsive means thereafter being effective for re-opening said by-pass valve and reversing said motor means.

2. A machine tool as in claim 1, including in said responsive means devices for effecting the re-opening of said by-pass valve after a further forward feeding movement.

3. A machine tool as in claim 1, including in said responsive means devices for effecting a reversal of the motor means and a re-opening of said by-pass valve after a further forward feeding movement.

4. In a drilling machine, fixed and movable structures, said fixed structure including a cylinder and said movable structure including a piston in said cylinder, a nut connected to said movable structure, a screw engaged with said nut and journaled in said fixed structure, a reversible feed motor for rotating said screw, a pump, a drill spindle on said movable structure, second motor means for driving said pump and spindle, a delivery conduit from said pump to one end of said cylinder, a low pressure relief valve, a shut-off valve, a conduit including said relief and shut-off valves and in communication with both ends of the cylinder and effective when the shut-off valve is open to permit passage of fluid therethrough so that the screw and nut may produce a rapid forward movement of the movable structure substantially independently of the pump delivery, means responsive to the distance of forward movement of the movable structure and operating upon a predetermined amount of forward movement to close said shut-off valve and upon a further predetermined amount of forward movement to effect the re-opening of the shut-off valve and the reversal of said feed motor, and flow-controlling means for regulating the escape of fluid from the other end of said cylinder.

5. In a drilling machine, fixed and movable structures, said fixed structure including a cylinder and said movable structure including a piston in said cylinder, a nut connected to said movable structure, a hollow screw engaged with said nut and journaled in said fixed structure, a reversible feed motor for rotating said screw, a pump, a drill spindle on said movable structure extending through said hollow screw, second motor means for driving said pump and spindle, a delivery conduit from said pump to one end of said cylinder, a low pressure relief valve, a shut-off valve, a conduit including said relief and shut-off valves and in communication with both ends of the cylinder and effective when the shut-off valve is open to permit passage of fluid therethrough so that the screw and nut may produce a rapid forward movement of the movable structure substantially independently of the pump delivery, means responsive to the distance of forward movement of the movable structure and operating upon a predetermined amount of forward movement to close said shut-off valve and upon a further predetermined amount of forward movement to effect a re-opening of the shut-off valve and the reversal of said feed motor, and flow-controlling means for regulating the escape of fluid from the other end of said cylinder.

6. In a machine tool, fixed and movable structures, a reversible feed motor connected for moving said movable structure at a rapid rate when low resistance is opposed thereto and effective while energized for maintaining an effort upon the movable structure for moving it, cylinder and piston members connected to said fixed and movable structures for moving the same, a pump and driving means therefor, reversing switch means for controlling the energization of said feed motor, a conduit from said pump to one end of said cylinder, a by-pass conduit between the ends of said cylinder, a shut-off valve on said by-pass conduit, a control relay, a trip switch, devices responsive to the amounts of relative movement of the movable and fixed structures, circuits connecting said reversing switch means, control relay and trip switch so constructed and arranged that said trip switch upon closing procures an operation of the control relay and thereby of the reversing switch means for forward movement by the feed motor, said circuits including a maintaining circuit controlled by said responsive devices for holding the control relay closed during the forward movement and to release the control relay for opening at the end of a predetermined forward movement, and said circuits being constructed and arranged to procure a reversal of the reversing switch means upon opening of the control relay, said responsive devices including means for effecting de-energization of the reversing switch means upon the completion of the return movement, and means included in said responsive devices for closing the shut-off valve after a predetermined forward movement and re-opening the valve at the end of the forward movement.

7. A machine tool as in claim 6, in which the control relay includes timing means for delaying the opening of the relay when de-energized, and in which the energization of the reversing switch means for forward movement is also controlled by said responsive devices to be de-energized at the end of the forward movement, so that a dwell occurs between the deenergization of the reversing switch means for the forward movement and the re-energization thereof for the return movement.

8. In a drilling machine, fixed and movable structures, said fixed structure including a cylinder, said movable structure including a hollow piston in said cylinder and also including a nut, a hollow threaded spindle mounted on the fixed structure and in the hollow piston and engaged with the nut, a drill spindle extending through the hollow spindle, a reversible feed motor for rotating the threaded spindle, a pump, a spindle motor for driving the pump and a transmission from the spindle motor to the drill spindle, a delivery conduit from the pump to one end of the cylinder whereby fluid from the pump may be used to assist the feed motor in producing forward movement of the movable structure, an escape conduit from the other end of the cylinder and including a metering valve, a by-pass conduit from one end of the cylinder to the other, and by-pass valve means responsive to the amount of forward movement for permitting the escape of fluid through the by-pass conduit past the piston during an initial forward movement and preventing such escape during a further forward movement so that the piston movement is restricted to a rate determined by the metering valve.

9. In a drilling machine, fixed and movable structures, said fixed structure including a cylinder, said movable structure including a hollow piston in said cylinder and also including a nut, a hollow threaded spindle mounted on the fixed structure and in the hollow piston and engaged with the nut, a drill spindle extending through the hollow spindle, a reversible feed motor for rotating the threaded spindle, a pump, a spindle motor for driving the pump and a transmission from the spindle motor to the drill spindle, a delivery conduit from the pump to one end of the cylinder whereby fluid from the pump may be used to assist the feed motor in producing forward movement of the movable structure, an escape conduit from the other end of the cylinder and including a metering valve, a by-pass conduit from one end of the cylinder to the other, and by-pass valve means responsive to the amount of forward movement for permitting the escape of fluid through the by-pass conduit past the piston during an initial forward movement and preventing such escape during a further forward movement, so that the piston movement is restricted to a rate determined by the metering valve.

10. In a machine tool, fixed and movable structures, cylinder and piston members connected to the structures, a pump, a delivery conduit from the pump to one end of the cylinder member, an escape conduit from the other end of the cylinder member and including a metering valve, a by-pass conduit between the ends of the cylinder member and including an electrically actuated by-pass shut-off valve, and a feed controlling system including a reversible feed motor connected for moving the movable structure, switch means responsive to the amount of such movement for energizing said feed motor for forward movement from a withdrawn position and for withdrawal movement from an advanced position, and electric circuit means included in said feed controlling system and actuated in response to a predetermined amount of advancing movement for energizing said by-pass valve to close the same, and operated for the re-opening of the same at the end of a further advancing movement and therewith effecting an energization of said switch means for procuring a reversal of the feed motor.

11. A machine tool comprising fixed and movable structures, cylinder and piston members connected to said structures, a source of liquid under pressure, conduit means connecting said source to one end of the cylinder member for delivering liquid thereto for effecting a slow working feed of the movable structure, a by-pass conduit means connecting the ends of the cylinder member and valve means for obstructing such by-pass, reversible power driven means for causing the movable structure to be traversed back and forth at a rapid rate, means responsive to the distance of movement of said movable structure for operating said by-pass valve means for preventing flow between the ends of the cylinder member while liquid is being delivered to said one end thereof from said source and thereby preventing said power-driven means from accomplishing a forward traverse of the movable structure, and means for limiting the escape of liquid from the other end of the cylinder member whereby to determine the rate of forward traverse of said movable structure.

12. A machine tool comprising fixed and movable structures, cylinder and piston members connected to said structures, a source of liquid under pressure, conduit means connecting said source to one end of the cylinder member for delivering liquid thereto for effecting a slow forward working feed of the movable structure, a by-pass conduit means connecting the ends of the cylinder member and valve means for closing such by-pass, a further conduit means having a metering device therein for regulating the escape of liquid from the other end of the cylinder when said valve means is closed, power driven means for causing the movable structure to be traversed back and forth at a rapid rate when said by-pass valve is open, and means responsive to the distance of movement of said movable structure for operating said by-pass valve means for restricting the rate of flow from the other end of the cylinder member while liquid is being delivered to said one end thereof from said source, said means comprising a contact plate moved with the movable member, contacts cooperative with said plate and circuit means connected therewith for electromagnetically moving said by-pass valve means and effecting a reversal of said power driven means.

13. A machine tool comprising fixed and movable structures, cylinder and piston members connected to said structures, a source of liquid under pressure, conduit means connecting said source to one end of the cylinder member for delivering liquid thereto for effecting a slow working feed of the movable structure, a by-pass conduit means connecting the ends of the cylinder member and valve means for obstructing such by-pass, a separate power means, a transmission driven by said power means for causing the movable structure to be moved forward rapidly, means responsive to the distance of movement of said movable structure for closing said by-pass valve means so that the liquid trapped in the other end of the cylinder operates to prevent a further forward rapid movement of the movable structure by said power means, and an escape conduit connected with said other end of the cylinder and including metering means for regulating the escape of liquid from said other end of the cylinder.

EDWARD JOSLIN KINGSBURY.